United States Patent [19] [11] Patent Number: 4,989,560
Rasdal et al. [45] Date of Patent: Feb. 5, 1991

[54] AUTOMOTIVE ENGINE OIL LEVEL SURVEILLANCE SYSTEM

[75] Inventors: Marlin C. Rasdal, Keno; Virgil J. Rasdal, Klamath Falls; Mark C. Bates, Sandy, all of Oreg.

[73] Assignee: Tech. Telesis Ltd., Klamath Falls, Oreg.

[21] Appl. No.: 416,496

[22] Filed: Oct. 3, 1989

[51] Int. Cl.⁵ ............................................. F01M 1/00
[52] U.S. Cl. ............................. 123/196 S; 184/103.1
[58] Field of Search ................... 123/196 S; 184/103.1

[56] References Cited

U.S. PATENT DOCUMENTS

| 4,108,201 | 8/1978 | Lang | 184/103.1 |
| 4,480,610 | 11/1984 | Stinson | 123/196 S |
| 4,480,718 | 11/1984 | Marinelli | 184/103.1 |
| 4,491,103 | 1/1985 | Deadman | 184/103.1 |
| 4,495,909 | 1/1985 | Hurner | 184/103.1 |
| 4,563,988 | 1/1986 | Weishaupt | 123/196 S |

Primary Examiner—E. Rollins Cross
Attorney, Agent, or Firm—Owen, Wickersham & Erickson

[57] ABSTRACT

An engine crankcase oil surveillance system with restoration of oil sufficiency. A vertical oil detection member extends down and into the engine sump. A timer is set for a specific period of time after initiation. The timer is initiated upon shut-off of the engine ignition system. An oil level indicator is activated when said timed period has taken place, and determines the sump oil level. An oil supply means is connected to a reservoir and to the oil level indicator for supplying reserve oil from the reservoir to the sump, upon indication by the oil level indicator that the sump oil level is below a predetermined level. The fluid from the reservoir is cut off the desired oil level is reached.

4 Claims, 7 Drawing Sheets

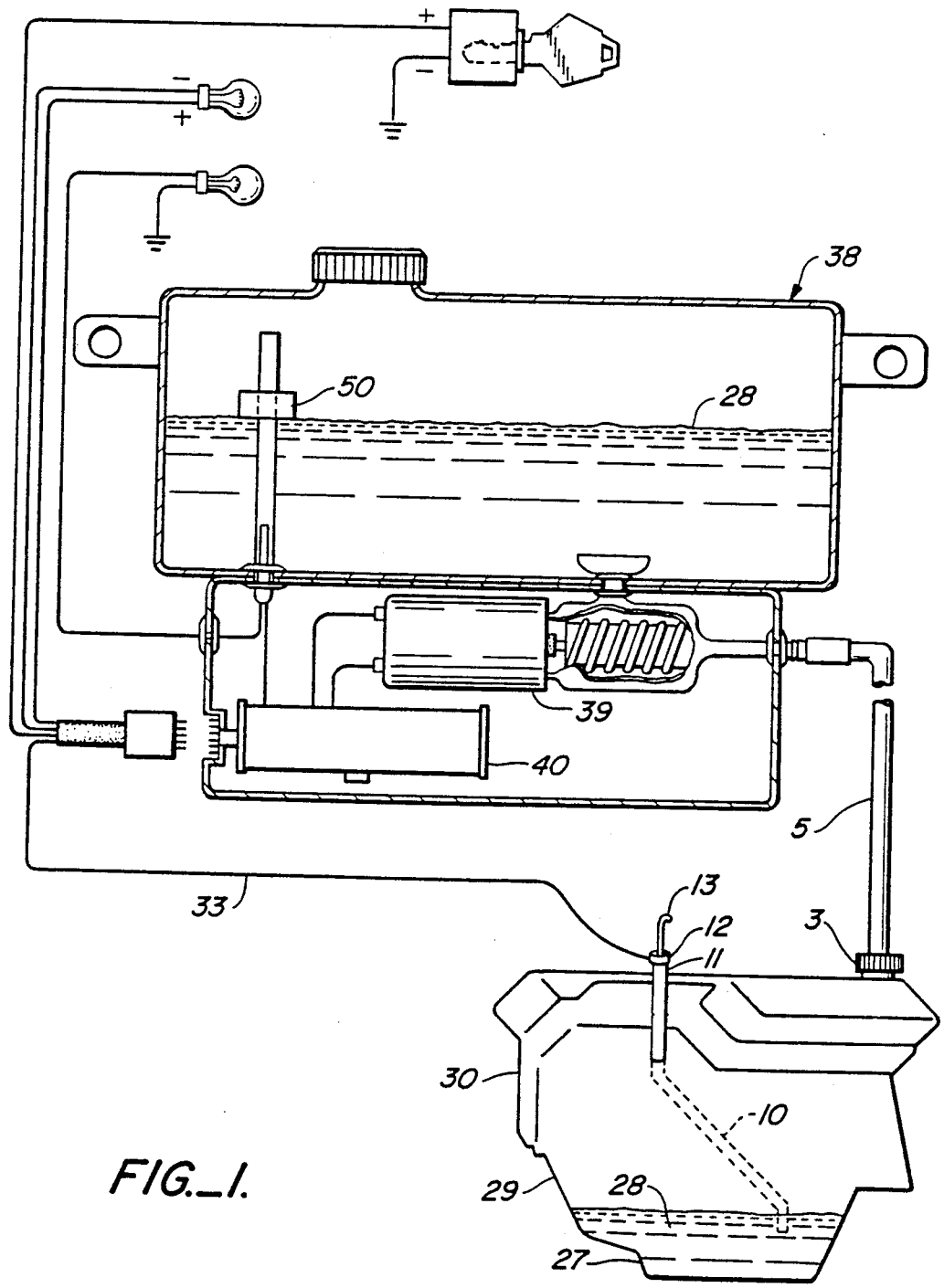
FIG._1.

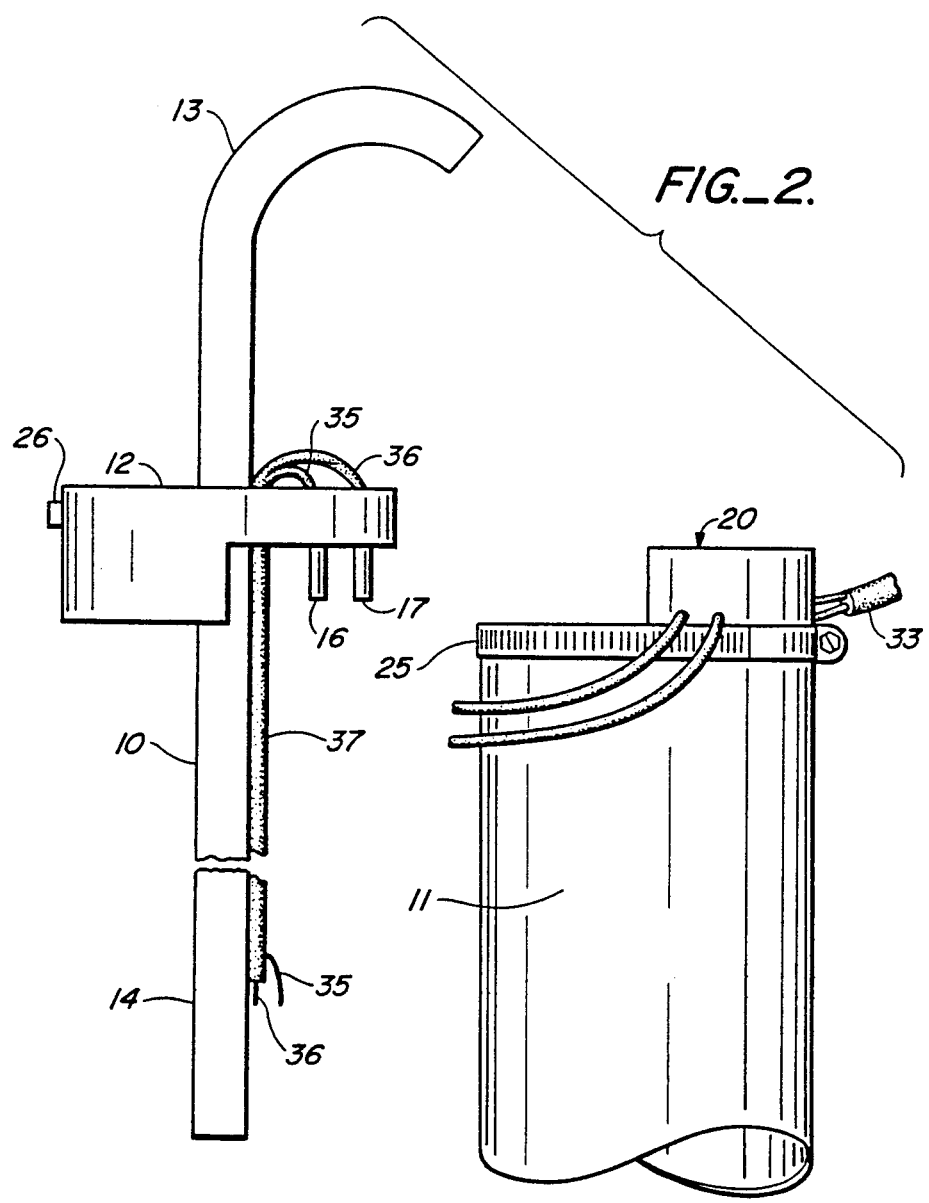
FIG._2.

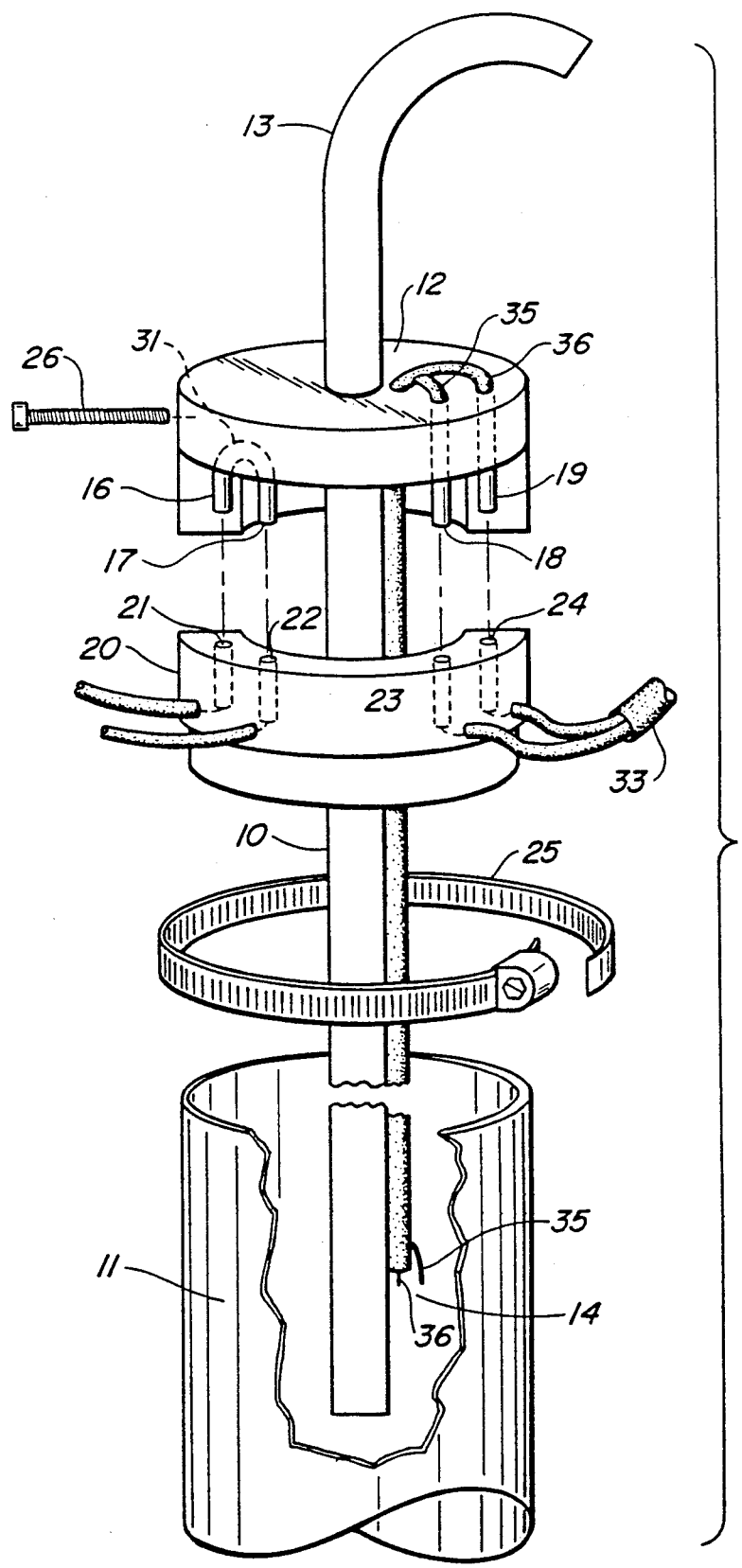
FIG._3.

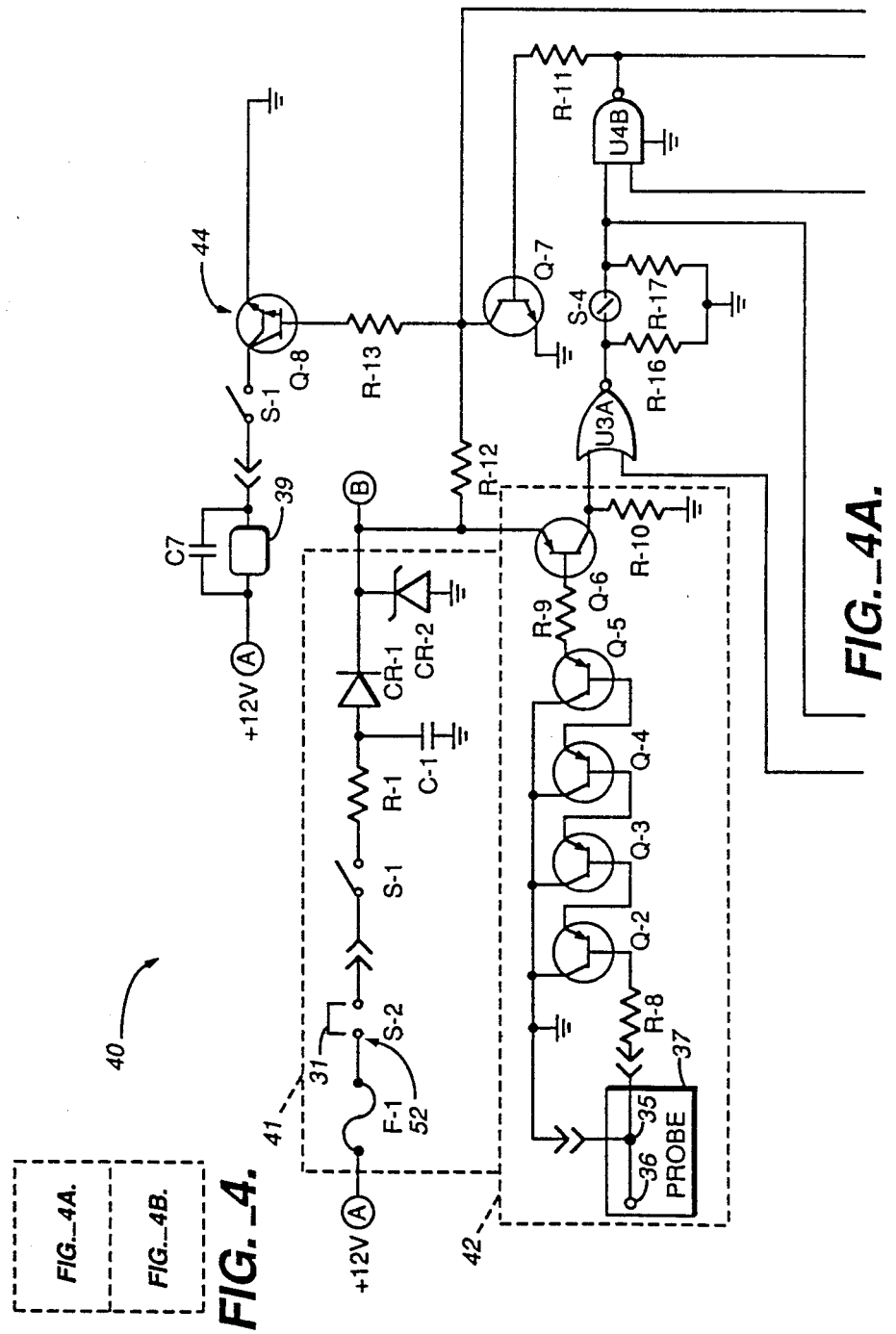

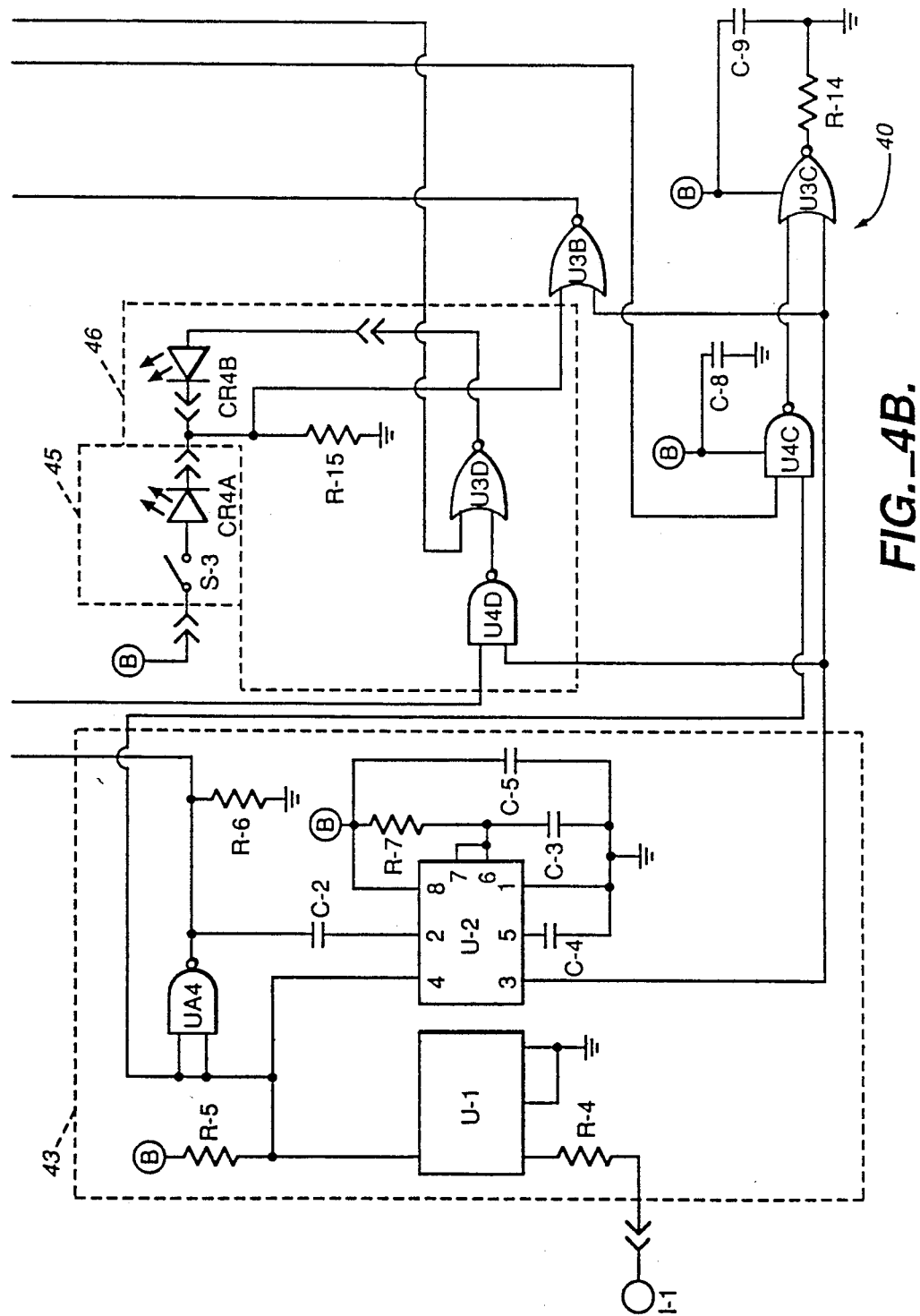
FIG._4B.

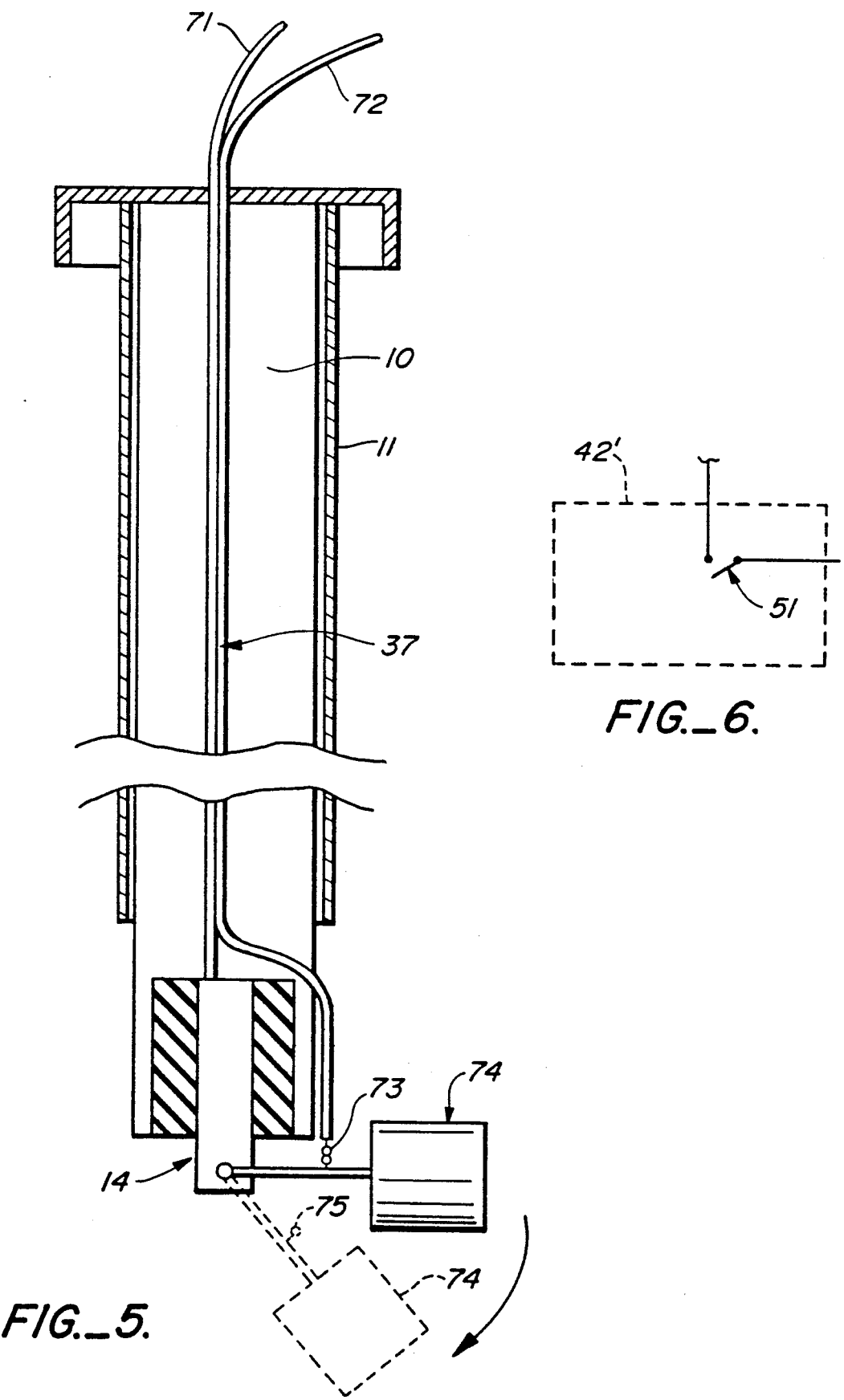

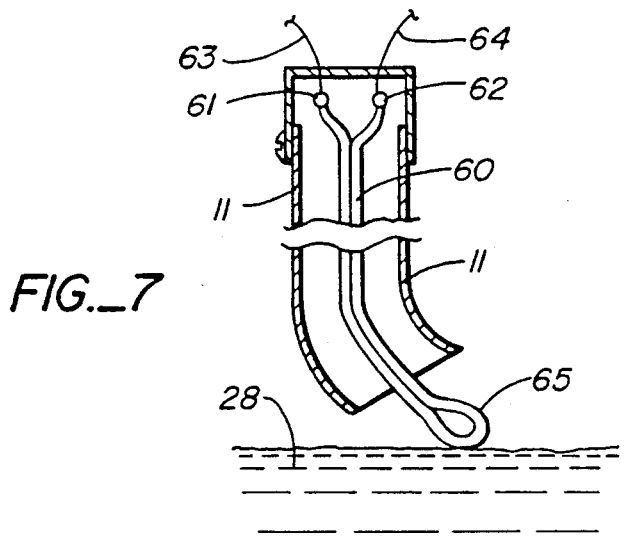
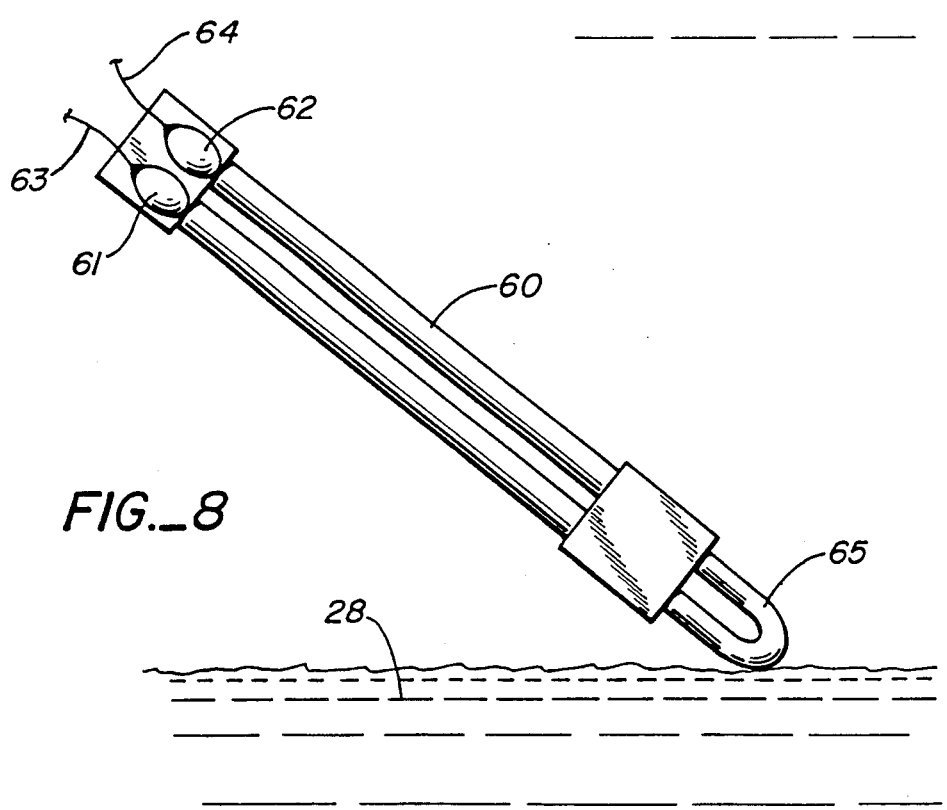

AUTOMOTIVE ENGINE OIL LEVEL SURVEILLANCE SYSTEM

This invention relates to an engine crank case oil surveillance system for sensing, after the engine has been turned off for a predetermined period of time, whether there is sufficient oil in the engine sump. If there is not, the insufficiency is automatically corrected by adding oil to the proper level.

BACKGROUND OF THE INVENTION

In automotive systems, lubrication is essential. When the engine is operating, the oil is circulated. When the engine is turned off, most of the oil collects in a sump provided in the engine and the oil level rises, normally, to a level indicating that there is sufficient oil in the engine sump. When the oil level is at a sufficient height, the engine when started, will be properly lubricated. At that time during operation, the oil is again circulated through the engine, and therefore most of it is withdrawn from the sump.

Various devices and systems have been used or proposed for determining the level of the engine oil for proper circulation when the engine is turned off, in order to make sure that there is enough oil for proper circulation of lubrication when the engine is again turned on. A primitive indication may be obtained by a dipstick, but the use of a dipstick requires one to raise the hood, pull the dipstick out, wipe it off, put it back in, and pull it out again. Prior-art devices and system proposed to replace the dipstick have been either very expensive or have not been able to obtain the desired results.

An object of this invention is to provide an inexpensive yet accurate system for determining whether (after a predetermined time following turning the engine off), there is the proper amount of oil in the sump; that is, whether the oil has risen to a desired height or level.

Another object of the invention is to supply the engine sump with additional oil when the sensor indicates that there is an insufficient amount of oil in the sump at that time.

Another object of the invention is to warn the driver or other engine operator when the reserve oil supply reservoir for adding oil to the engine sump needs additional oil or else replacement of reserve oil in the reservoir.

SUMMARY OF THE INVENTION

The engine oil surveillance system of this invention includes a circuit box with an omnidirectional switch. The system also includes a timing device which turns on the surveillance system after the engine has been turned off for a predetermined period of time, typically about five minutes, and for then sensing the oil level in the sump. The system further includes a sensing device or sensor for sensing the oil level, warning means for indicating when the sensed oil level is below a certain height, a test light for use in testing the system, an oil reservoir for reserve oil mounted above the oil in the engine compartment, and means for transferring reserve oil from the reservoir to the sump when additional oil is needed by the engine. The device can be mounted in an automobile under the engine hood and above the oil level; it can, in fact, be mounted in any engine having a crank case, whether the engine be stationary or mobile. The reserve oil reservoir is connected to a pump and has an outlet connected to the sump, as through the oil fill cap.

The sensor itself may be installed in a tube, such as the tube provided in an automobile engine or other engine for the dipstick, the old dipstick having been removed or modified.

Thus, when the engine is turned off, a suitable delay period is initiated. This may be about five minutes. At the end of this period, the surveillance system is turned on and the sensor determines whether the oil in the engine sump has reached the proper level. If it has, nothing further need be done. If it has not, then the system initiates action to add oil to the engine from the oil reserve reservoir, instead of requiring the driver to open the engine hood or drive to a filling station or take such other steps. When the proper amount of oil has been added, nothing more is done during this period. If and when the oil reserve reservoir reaches a low level, a warning is given to the operator of the engine to let him know that he should replace or refill the oil in the engine reservoir.

Among the advantages of the invention are the following: The device checks the engine a few minutes after the engine has been turned off. It senses, automatically, whether the oil is at the proper level in the sump. The sensor may be mounted inside the dip-stick tube, as said, and a set screw may be tightened to hold it in place. If necessary, the sensor acts to cause oil to be added to bring the sump oil up to the proper level. Thereby the life of the engine is prolonged.

When the sensor senses that the oil level is below the proper level, a circuit automatically turns on the pump, which pumps oil from an oil reservoir 38. When the oil reaches the proper level and is so indicated by the sensor, a circuit board is actuated to turn off the pump altogether.

A tilt sensor may be provided to indicate whether the circuit is to be turned on or not. The point here is that if the automobile or engine is tilted, the sump might be overfilled; the tilt sensor thereby avoids over-filling the engine with oil.

A light fixture may be placed on the dashboard of the passenger compartment to come on when the extra oil container needs to be refilled or replaced.

The circuit box is typically installed under the hood of the vehicle. It is intended to be mounted at a time when the device is level and the vehicle itself is level. The box may be located at any convenient place.

The reserve warning light may be a light-emitting diode (LED) mounted on the dash board or on the hood of the automobile, or at any other convenient location. It is connected to the sensor and the reserve reservoir to give warning that the reserve needs refilling.

The reserve oil container is preferably mounted at a place reasonably near the sump. It is above the sump, and tubing may be attached to connect the reservoir to the pumps via the oil-fill cap on the engine.

The device reduces or limits the chance of damage to the engine or injury to the individual who works with the engine, as when putting his hands into the engine compartment during the time when the oil is being checked.

Other features objects, and advantages of the invention will appear from the following description of a preferred embodiment of the invention.

BRIEF DESCRIPTION OF THE DRAWINGS

FIG. 1 is a schematic view partly in perspective and partly in side elevation of an internal combustion engine embodying the principles of the invention.

FIG. 2 is an enlarged side view of the level sensor dipstick and the top portion of the dipstick tube of the apparatus of FIG. 1.

FIG. 3 is a fragmentary enlarged view in elevation and partly in section of a modified form of the device embodying the principles of the invention.

FIG. 4 is a circuit diagram of the control box circuit. It is shown on two sheets as FIG. 4A and FIG. 4B.

FIG. 5 is a diagrammatic view in elevation and is a partial section of an alternate form of sensor for the device.

FIG. 6 is a diagrammatic view of an alternative form of FIG. 5.

FIG. 7 is a diagrammatic view in elevation of a sensor using a fiber-optic sensing means, with parts cut away.

FIG. 8 is an alternate form of sensor shown diagrammatically.

DESCRIPTION OF A PREFERRED EMBODIMENT OF THE INVENTION

With reference to FIG. 1, a dipstick 10 extends down through a dipstick tube 11. The dipstick tube 11 is closed at its upper end by a cap 12. The dipstick itself 10 has a handle or upper end 13 and an active or lower end 14.

The cap 12 serves as a male connector housing, which is preferably made from phenolic resin or other nonmetallic and non-conductive material. One side of the cap 12 is a series of four male connector pins 16, 17, 18, and 19.

Secured to the dipstick tube 11 is a lower or female connector housing 20 having four female sockets or connectors 21, 22, 23, and 24 for engaging, respectively, the four connectors 16, 17, 18, and 19. A clamp 25 clamps the female connector housing 20 to the dipstick tube 11, and a set screw 26 connects the dipstick 10 to the cap 12. The dipstick 10 extends down into an engine sump 27 which contains oil 28 with an upper level which lies below a lower end 29 of an engine block 30.

The dipstick 10 may remain in its normal position during normal operation and may be used in the normal manner, whereas the connectors 16, 17, 18, 19 and the conductors secured to them provide a different system.

The assembly in FIGS. 2 and 3 provide access to the probe system.

Thus the adapter made up of the male connector housing cap 12 with its connectors 16, 17, 18, and 19 cooperates with the female connector housing 20 and its sockets 21, 22, 23, and 24. The assembly is polarized, so that it cannot be connected except in the correct manner. When the male and female connector housings 12 and 20 are connected, there is a low-insertion-force friction, and conductive engagement provides for electrical conduction.

The lower or female connector housing 20 is preferably semi-circular in shape to provide a mechanical fit to the dipstick tube 11. The male or upper connector 12 is preferably snugly connected to the dipstick 10 by the set screw 26.

It will be noted that the male connectors 16 and 17 are a single U-shaped member 31 which functions as a switch 52 of circuit 40. A co-axial cable 33 is provided and is connected to the female connectors 23 and 24 and extends to the electrical portion of the system on the other end. The male connectors 18 and 19 are connected to an extension 37 of the co-axial cable 33, which runs along the length of the dipstick 10. Conductors 35 and 36 are bared and provide an electrical contact when immersed in the oil 28.

The circuit will now be described. A circuit 40 comprises a power supply section 41, an oil probe section 42, an ignition and timer section 43, a logic circuitry and pump section 44, an oil reservoir sensor section 45, and a test light section 46.

Oil Surveillance System Circuit Detailed Description

Power Supply Section 41

A car battery A sends 12-volts DC into the power supply section 41 through an oil change switch S-1. The switch S-1 is an on/off switch. A dipstick cap switch S-2 or 31 ensures that the dipstick 10 is fully seated, and a fuse F-1 prevents circuit damage due to excessive current draw.

The 12-volt input goes through an RC filter network comprising a resistor R-1 and a capacitor C-1 to absorb voltage spikes and transients. Any spikes over 15 volts are shorted to ground by a 15 volt zener diode CR-2. A diode CR-1 prevents negative voltage transients from entering the balance of the circuit 41.

Oil Probe Section 42

The engine oil 28 acts as a dielectric, which induces capacitance Co across the two leads 35 and 36 of the oil probe 37. Alternatively, a float switch (5) could be affixed to the lower end 14 of the dipstick 10, as shown in FIG. 5. The oil probe section 42 would then be modified to accommodate the switch 51 as shown in FIG. 6. The capacitance Co is amplified by a network made up of transistors Q-2, Q-3, Q-4, and Q-5 coupled together as a cascaded Darlington amplifier. This network develops a voltage across a resistance R-9 which is applied to the base of a transistor Q-6, causing the transistor Q-6 to conduct, sending to a gate U-3A a logic-high, which otherwise has a logic low produced by a collector resistor R-10. A resistor R-8 precedes the transistor Q-2 for impedance matching. When no oil 28 is present, the probe section 42 is essentially an open circuit and prevents the transistor Q-6 from conducting.

Ignition and Timer Section 43

When an ignition switch I-1 is turned on, voltage is applied to the input of an opto-isolator U-1, which isolates voltage spikes from the engine ignition system through a current limiter R-4. The opto-isolator U-1 is turned on, applying a logic low to inputs of NAND gates U-4A, and U-4C. This low disables the NAND gate U-4C. The low is also applied to pin P4 of a timer U-2, causing it to reset. An invertor U-4A inverts the low to a high, which is then applied to the input of NOR gate U-3A to disable it. Once the ignition is turned off, the opto-isolator U-1 turns off, the reset voltage is removed from the timer U-2, and 10 volts is applied through a resistor R-5 to the gates U-4A and U-4C removing the disable from the gate U-4C. The 10 volts is inverted through the gate U-4A to a low, which is then applied to the gate U-3A, removing its disable.

The low is also applied to a pulse-forming or RC network, with a capacitor C-2 and a resistor R-6. The resulting negative pulse is applied to a pin P2 of a timer U-2 which triggers the timer U-2 on for approximately five minutes. The time is determined by the combination of the resistor R-7 and capacitor C-3. A capacitance C-4 is used to couple an unused pin P5 to ground.

A power supply decoupling capacitor C-5 prevents power supply voltage fluctuations from triggering erroneous timing.

When the ignition I-1 is turned off, the output on pin P3 of the timer U-2 goes high, thereby disabling NOR gates U-3B and U-3C and enabling NAND gate U-4D. After five minutes, the output of the timer U-2 goes low, removing the disable from the inputs of the gates U-3B and U-3C, and disabling the gate U-4D. The timer U-2 disables the circuit 40 for five minutes after engine shut-down to allow oil in the engine block 30 to drain back into the oil pan 27 before the oil level is detected.

Logic Circuitry and Pump Section 44

The logic circuitry is composed of a quad 2-input NAND gate I.C., a quad 2-input NOR gate I.C., and associated components. When the ignition is turned off, a logic high is applied to the inputs of the NAND gate U-4A. This high is inverted to a low and applied to an input of the NOR gate U-3A.

When the output of the oil probe circuit 42 is low, indicating a low oil level in the sump 27, the low is applied to the other input of the gate U-3A. With both inputs low, the gate U-3A is enabled, and a high is applied, through a mercury level switch S-4 to inputs of the NAND gates U-4B and U-4D. If the switch S-4 is open, the inputs to the gate U-4B and U-4D are held low through a resistance R-16 to disable them. A resistance R-17 provides a load for the output of the gate U-3A. After the timer U-2 output goes low, one input to the NOR gate U-3B is low. The other input to the gate U-3B is low when the output of the reservoir circuit 45 is a logic low. With both inputs to the gate U-3B low, the gate U-3B is enabled, and a high is applied to the other input of the gate U-4B. With both inputs high, the gate U-4B is enabled, and a low is applied to an input of the NAND gate U-4C, and through an isolation resistor R-11 to the base of a transistor Q-7, which turns the transistor Q-7 off. The transistor Q-7 is used as an isolator between the digital circuitry and the Darlington transistor Q-8.

With the transistor Q-7 off, a high is applied through resistors R-12 and R-13 to the base of the transistor Q-8 and to the NOR gate U-3D, enabling it. The transistor Q-8 turns on and provides a ground for an oil pump motor 39. A capacitor C-7 absorbs the current spike, created by the windings of the oil pump motor 39 when it is turned on, preventing false triggering of the timer U-2. The gates U-3C and U-4C are for future growth. A resistor R-14 provides a load for the output of the gate U-3C.

Oil Reservoir Sensor Section 45

With oil in a reservoir 38, the switch S-3 is open, allowing a ground to enable the gate U-3B. When the reservoir 38 is low, a floating magnet 50 operates a reed switch S-3, closing it, and allows current to flow through an LED CR-4A, and a current limiter R-15. This turns on the red LED CR-4A and disables the logic circuitry by putting a high on one input of the gate U-3B.

Test Light Section 46

A green test light CR-4B is activated by a NAND gate U-4D and the NOR gate U-3D. One of the inputs of the gate U-4D is enabled through an OMNI directional mercury level switch S-4 by the output of the NOR gate U-3A. When the level switch S-4 is open, the gate U-4D is disabled by a low, felt through a resistance R-16.

When the car is level, the switch S-4 is then closed and a high output from the gate U-3A is felt on one input of the gate U-4D.

This state occurs when the ignition I-1 is off and the oil probe 37 is not in contact with oil 28. The other input of the gate U-4D is high for five minutes after the ignition I-1 is turned off, while the output of the timer U-2 is high. With both inputs to the gate U4D high, a low output is applied to one of the inputs of the gate U-3D. The other input to the gate U-3D comes from the output of the motor isolation transistor Q-7.

While the logic circuitry is disabled, the transistor Q-7 is turned on, providing a low to the other input of the gate U-3D while it also provides a low to the base of the transistor Q-8 to keep it off. With both inputs low, the gate U-3D is enabled, providing a high to the anode of a diode CR-4B, which is a green LED. The cathode of the diode CR-4B is connected through a current limiter R-15 to ground.

Basic Circuit Operation

The circuit is designed to sense the oil level in an engine 30 five minutes after the ignition I-1 is turned off. If the oil 28 is low, this circuit will turn on a pump 36, which puts more oil into the engine 30 from a separate oil reservoir 38. Once the oil pan 27 is full, the pump 36 will be turned back off. The circuit also has a self-test function which checks to see if the circuit is operational.

All these seven conditions must be met for the circuit to operate:

1. The on/off switch S-1 is in the closed position.
2. The dipstick is all the way down into the tube 11.
3. There is a good fuse F1.
4. There is oil 28 in the oil reservoir 38, i.e., there is reserve oil.
5. The ignition I-1 is off.
6. The car is level.
7. The oil 28 in the oil pan 27 is low.

If the oil change switch S-1 is in the open position, or if the dipstick 10 is not all the way down into the tube 11, or if the fuse F1 is blown, there will be no power applied to the circuit 40.

If the first three conditions are met, power will be applied to the circuit 40. The circuit will then be activated once the ignition I-1 is turned off. Five minutes after the ignition I-1 is turned off, the circuit will check to see if there is reserve oil 28 in the reservoir 38, whether the car is level, and whether the oil 28 in the pan 27 is low.

If the oil 28 in the oil pan 27 is low, the pump 36 will be activated until the oil reaches the probe 37. If the oil 28 in the oil pan 27 is not low, or if any of the other conditions are not met, the circuit will not start the pump 36. If the oil reservoir 38 goes empty while the pump 36 is pumping, the circuit will shut itself off to prevent damage to the pump 36. Should the ignition I-1 be turned back on before the five minute time delay is over, the timer circuit will reset itself to start over once the ignition I-1 has been turned off again.

The circuit is provided with a two-color light that indicates when the oil reservoir 38 is low, and that the circuit is functioning properly. If the oil reservoir 38 is low, the light CR-4A will be red all the time the ignition is on.

The light CR-4B will be green during the test cycle. The test function checks the ignition optoisolator, the timer operation, the probe circuit, the car level switch, the pump isolation transistor Q-7, and the power supply. When the ignition I-1 is turned off, the green light CR-4B will come on until enough oil 28 can drip back into the pan 27 to reach the oil probe 37. If the oil 28 is low, then the green light CR-4B will go out after five minutes when the pump 56 turns on. If any of the seven conditions are not met, or if any of the mentioned circuitry is defective, the green test light will not come on.

An oil-level surveillance system employing a fiber-optic cable 60 for an engine 16 having an ignition switch 1 with means for turning the ignition switch on and off, the engine 16 having an oil circulation system, a sump 27, and a dip-stick tube 11. (See FIG. 7.)

An oil-level sensor 35, 36 is housed in the dipstick tube 11 and extends therebelow to a desired level. The sensor 35,36 comprises a fiber-optic cable 60, and an electric light 61 or 62 shining into one end of the fiber optic cable 60. Actuating means 63, 64 are provided for turning the electric light on and means 65 at the other end of the fiber-optic cable 60, providing an actuator 65. Timed delay means 40 connected to the ignition switch 1 and to the electric light 61, 62 is actuated upon the turning off of the ignition switch, for beginning a predetermined time-delay period at the end of which the actuating means 63, 64 is turned on. The sensor-actuated means 42 has a control circuit turned on by the actuating means after the delay period ends if the sensor detects that the oil level in the sump 27 is below its proper height.

In another form of the invention (see FIG. 8) an oil reserve reservoir 38 lies above the sump 27 and has a conduit leading to the sump, and an outlet for enabling the oil to flow from the reservoir 38 through the conduit 5 into said sump 27 when the control circuit 40 is actuated and for stopping oil flow when the control circuit 40 is turned off.

In FIG. 5 an oil-level sensor 72, is housed in the dipstick-tube 11 and extends therebelow to a desired level. This sensor 73, comprises an electrical control switch. Actuating means 24 for turning the sensor 71, 72 on and means at other end of the electrical control switch provide an actuator.

Timed-delay means connect the ignition switch 1 and to the sensor 71, 72 and is actuated upon the turning off of the ignition switch 1, for beginning a predetermined time-delay period, at the end of which the actuating means 74 is turned on. Sensor-activated means 75 has a control circuit turned on by the actuating means 74 after the delay period ends for the sensor 71, 72 detects that the oil level 78 in the sump 27 is below its proper height. An oil reserve reservoir 38 above said sump 27 has a conduit 5 leading to the sump 27, and an outlet for enabling the oil 28 to flow from the reservoir 38 through the conduit 5 into the sump 27 when the control circuit is actuated and for when the control circuit is turned off.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. An engine crankcase oil surveillance system with restoration of oil sufficiency if needed, for use with an engine having a sump and an ignition system, comprising a vertical oil detection member extending down to and into said pump;

timing means set for a specific period of time after initiation;

timer initiation means for initiating said timing means upon shut-off of said engine ignition system that has been on;

oil level indicating means including a dip stick tube activated upon said timed period having taken place, for determining the oil level in said sump;

a reserve oil reservoir;

pump means connected to said reservoir for supplying reserve oil from said reservoir to said sump;

control means connected to said oil indicating means for activating said pump means upon indication by said oil level indicating means that the oil level in said sump is below a predetermined level; and for cutting off fluid from said reservoir to said sump when said sump is filled to said predetermined level;

liquid level sensor means in said reservoir; and switch means responsive to said sensor means for turning off said pump means when oil in said reservoir is exhausted or nearly exhausted.

2. The oil surveillance system of claim 1 wherein said oil level indicating means comprises an oil-level sensor housed in said dip-stick tube and extending therebelow into said sump to a desired level, said sensor comprising an electrical control switch with actuating means for turning the sensor on and float means at the lower end of said electrical control switch to provide a circuit closing actuator.

3. The oil surveillance system of claim 2 wherein said oil-level sensor including said timing means is connected to said ignition system and to the sensor and is actuated upon the turning off of the ignition system for beginning a predetermined time-delay period, at the end of which said actuating means is turned on.

4. The oil surveillance system of claim 1 including a warning light activated by said control means for indicating that the oil in said reservoir is exhausted.

* * * * *